United States Patent [19]
Delmore et al.

[11] Patent Number: 5,516,273
[45] Date of Patent: May 14, 1996

[54] DIE FOR EXTRUDING A FLUID STREAM

[75] Inventors: Michael D. Delmore, Mounds View, Minn.; Gary W. Maier, Warren Township, Wis.

[73] Assignee: Minnesota Mining and Manufacturing Company, St. Paul, Minn.

[21] Appl. No.: 301,241

[22] Filed: Sep. 6, 1994

[51] Int. Cl.⁶ .......................... B29C 47/14; B29C 47/30
[52] U.S. Cl. .......................... 425/192 R; 425/382.400; 425/464; 425/467
[58] Field of Search ............... 425/382.4, 461, 425/467, 464, 190, 192 R, 133.5

[56] References Cited

U.S. PATENT DOCUMENTS

| | | | |
|---|---|---|---|
| 4,051,926 | 4/1977 | Nehmey | 425/382.4 |
| 4,185,951 | 1/1980 | Webermeier et al. | 425/382.4 |
| 4,217,322 | 8/1980 | Sugano et al. | 425/133.5 |
| 4,283,168 | 8/1981 | Miller et al. | 425/382.4 |
| 4,502,479 | 3/1985 | Garwood et al. | 128/90 |
| 4,570,622 | 2/1986 | von Bonin et al. | 128/90 |
| 4,609,578 | 9/1986 | Reed | 428/76 |
| 4,619,802 | 10/1986 | Cloeren | 425/467 |
| 4,667,661 | 5/1987 | Scholz et al. | 128/90 |
| 4,774,937 | 10/1988 | Scholz et al. | 128/90 |
| 4,828,779 | 5/1989 | Hiraki et al. | 264/171 |
| 4,883,421 | 11/1989 | Morgan | 425/382.4 |
| 4,892,473 | 1/1990 | Elia et al. | 425/382.4 |
| 5,059,371 | 10/1991 | Saheki et al. | 425/467 |
| 5,072,688 | 12/1991 | Chino et al. | 425/133.5 |
| 5,234,330 | 8/1993 | Billow et al. | 425/190 |
| 5,281,380 | 1/1994 | Umeda et al. | 425/467 |
| 5,419,696 | 5/1995 | Henson | 425/467 |

FOREIGN PATENT DOCUMENTS

| | | |
|---|---|---|
| 57-014018 | of 0000 | Japan . |
| 57-100032 | of 0000 | Japan . |
| 808296 | 3/1981 | U.S.S.R. ................. 425/467 |

*Primary Examiner*—Khanh P. Nguyen
*Attorney, Agent, or Firm*—Gary L. Griswold; Walter N. Kirn; James D. Christoff

[57] ABSTRACT

A die useful in coating and extrusion processes has a housing and an insert removably received in a chamber of the housing. The insert controls to some extent the characteristics of fluid flow in the die as well as the fluid flow exiting the die. The insert is elongated and is round in sections perpendicular to its longitudinal axis, so that it may be inexpensively made by a lathe. As such, a number of inserts of varying configurations may be retained on hand and used as needed to vary the flow characteristics when desired.

7 Claims, 2 Drawing Sheets

DIE FOR EXTRUDING A FLUID STREAM

BACKGROUND OF THE INVENTION

1. Field of the Invention

This invention concerns an extrusion or coating die having a removable insert for changing the flow characteristics of the extruded fluid stream.

2. Description of the Related Art

A variety of goods are manufactured by processes that involve an extrusion or coating die. Some dies, for example, are used to form thin films, bars, or other elongated shapes of plastic material. Other dies are widely used to apply a coating of fluid material to a moving web.

One example of an item made by coating a moving web is adhesive tape. Many types of adhesive tape are made by spraying a liquid adhesive onto a plastic substrate that serves as a backing for the tape. Other examples of items made by coating a web include photographic film, coated paper and magnetic audio, video and data storage tapes. Another example is orthopedic splinting/casting tape, such as Scotchcast™ brand tape or Scotchcast Plus™ brand tape (both from 3M) which include a porous fiberglass backing that is coated with a water curable polyurethane resin.

The application of a liquid or semi-liquid material to a moving web is carried out in some instances by using a coating die. The die receives the material under pressure from a pump or other device, and distributes the fluid material in regions across the width of the web as the web is advanced along its longitudinal axis. The die may include an outlet slot that discharges the fluid in a ribbon onto the web, or alternatively may include a series of discharge nozzles that are arranged to distribute the fluid to various regions across the width of the web.

Conventional coating dies normally have an inlet passageway, an outlet passageway and an inner chamber that extends between the inlet passageway and the outlet passageway. The outlet passageway is relatively wide and often approximates the width of the web in instances where the die has a slot-type outlet for discharging a ribbon of fluid onto the web. The inner chamber is also relatively wide, and serves as a manifold to distribute incoming fluid from the inlet passageway to various regions of the outlet passageway.

Individuals who are skilled in the art of coating and extrusion die design sometimes refer to the "profile" provided by a particular die. The "profile" is a graphical representation of the flow rate of fluid measured at various locations across the width of the die outlet. For example, in some applications' a die with a flat profile is desired. A flat profile indicates that the flow rate of fluid is the same wherever it is measured along the width of the outlet. In other instances, a die having a parabolic profile is desired, which indicates that the flow rate of fluid is greatest at the center of the die outlet and decreases as either side of the die outlet is approached.

Traditionally, many coating and extrusion dies have had a triangular or "coat hanger" shape with a central inlet passageway, a relatively wide outlet passageway and an inner manifold chamber having a triangular shape to distribute the incoming fluid to various regions of the outlet passageway. However, because the inlet passageway is located directly across from the center of the outlet passageway, the flow rate of fluid in central portions of the outlet passageway tends to be greater than the flow rate of fluid near the ends of the outlet passageway. While such a profile may be suitable for some applications, it is unsuitable for other applications such as, for instance, when a die having a flat profile is desired.

A number of approaches have been suggested in the past for altering the profile of coat hanger dies. One approach is to vary the cross-sectional area of the inner chamber (in directions perpendicular to the flow of fluid) as either end of the chamber is approached. For example, by increasing the cross-sectional area of the chamber as either end is approached, the flow rate of fluid near the sides of the outlet passageway can be increased.

Coat hanger dies are typically made by machining two blocks of metal to make separable die halves. The inlet passageway, the outlet passageway and the inner chamber are formed in one or both of the die halves. If a different profile is needed, the shape of the chamber is altered by disassembling the die halves and re-machining one or both of the die halves. The shape of the chamber may also be altered by affixing one or more shims to side walls of the chamber in order to decrease the size of the chamber where desired.

Unfortunately, it is often difficult to design a die that provides a particular profile that is achieved the first time the die is put in service. In practice, a test run of a new die is conducted to observe its profile. Following the run, the two die halves are disassembled and the inner chamber and/or the shims are machined in an attempt to compensate for any deficiency of the profile. The die is then reassembled and the profile again observed.

It can be appreciated that the trial and error technique of adjusting the profile of a coat hanger die is somewhat time consuming and expensive. In addition, the profile may change when other process conditions are changed, such as the viscosity of the fluid or the total flow rate of fluid.

U.S. Pat. No. 5,234,330 describes a coat hanger die having two separable die halves and one or more inserts that are located in an inner chamber of the die when the die halves are assembled. The inserts vary in cross-sectional area along their length for increasing or decreasing adjacent cross-sectional areas of the chamber such that the profile of the die is affected.

There is a continuing need in the art to improve known coating and extrusion dies, so that the cost of constructing the die can be reduced. There is also a need to provide a die that is easy to clean when necessary without undue effort. Preferably, such a die would be adaptable for use with a wide range of liquids and semi-liquid materials and also under various process conditions.

SUMMARY OF THE INVENTION

The present invention is directed to a die for extruding a fluid stream and comprises a housing having inner wall sections defining a chamber. The housing includes an inlet passageway in communication with the chamber and an outlet passageway in communication with the chamber. The die also includes an insert removably received in the chamber. The insert has a body portion with a central axis and a flow-controlling peripheral surface extending in an arc around the central axis. The central axis is oriented generally perpendicular to the direction of fluid flow moving through the inlet passageway toward the chamber and moving through the outlet passageway away from the chamber. The insert has a first end portion and a second end portion. The body portion is located between the end portions. Both the first end portion and the second end portion are in detachable engagement with the wall sections of the housing.

Advantageously, the insert is relatively stable during operation because both end portions are in contact with the housing. Moreover, such construction obviates the need for fluid flow over ends of the insert, which might otherwise change the flow characteristics in the inner chamber in an undesirable fashion.

DETAILED DESCRIPTION OF THE PREFERRED EMBODIMENTS

Figure 1:
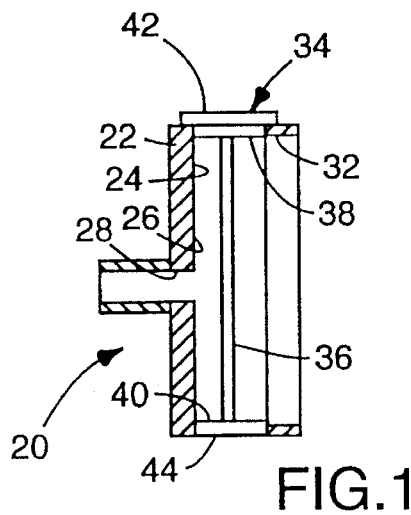
FIG. 1 is a horizontal cross-sectional view of a die constructed in accordance with the principles of the present invention.
Figure 2:
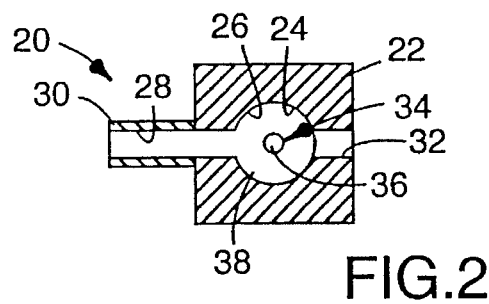
FIG. 2 is a side cross-sectional view of the die shown in FIG. 1, taken along lines 2—2 of FIG. 1.

A die 20 for extruding a fluid stream is illustrated in FIGS. 1 and 2 according to one embodiment of the invention and is useful for extrusion or coating applications. The die 20 includes a housing 22 made of, for example, a block of metallic material. The die has an inner, elongated cylindrical wall section 24 that defines an elongated cylindrical chamber 26 of the housing 22.

An inlet passageway 28 extends through the side of the housing 22 in a direction toward the middle of the central, longitudinal axis of the chamber 26, as can be understood by comparing FIGS. 1 and 2. The inlet passageway includes a threaded portion for connection to a rigid pipe 30. In turn, the pipe 30 is coupled by flexible or rigid tubing to a source of fluid that could be liquid or semi-liquid.

The housing 22 also includes an outlet passageway 32 in communication with the chamber. The outlet passageway 32 is in the form of a rectangular slot that extends in a direction along the length of the chamber 26 and in alignment with the longitudinal axis of the chamber 26. More particularly, a reference plane parallel to and centrally located between upper and lower walls of the housing 22 defining the outlet passageway 32 is also parallel to and passes through the central longitudinal axis of the chamber 26.

The die 20 also includes an insert 34 that is removably received in the chamber 26. The insert 34 includes a body portion 36 that is cylindrical in the example shown in FIGS. 1 and 2. The insert 34 also includes a first end portion 38 connected to one end of the body portion 36, and a second end portion 40 connected to the other end of the body portion 36 remote from the first end portion 38. The portions 38, 40 are either integral with the body portion 36, or are initially separate elements that are coupled (e.g., by machine screws) to the body portion 36.

The first and second end portions 38, 40 are both cylindrical and have a diameter that is slightly less than the diameter of the cylindrical chamber 26. For example, the chamber 26 may have a diameter of 0.75 in. (19.1 mm), while the first and second end portions 38, 40 may have a diameter of 0.748 in. (19.0 mm). The first and second end portions 38, 40 are slidably received in the chamber.

The insert 34 also includes an end cap 42 that is located next to the first end portion 38 remote from the body portion 36. The end cap 42 is larger in diameter than the diameter of the chamber 26 in order to cover the opening of the latter. If desired, a handle may be connected to the end cap 42 to facilitate removal of the insert 34 from the chamber 26.

Optionally, a gasket (not shown) is located between the end cap 42 and a circular region of the housing 22 surrounding the periphery of the chamber opening. Four machine screws extend through the end cap 42 and into the housing 22 in order to releasably lock the insert 34 in the chamber 26 and seal the end cap 42 to the housing 22.

A cover 44 is also provided over the opening of the chamber 26 remote from the end cap 42. The cover 44 is larger than the chamber 26, and has an inwardly facing, flat wall surface or wall section that defines the end of the chamber 26. Optionally, a gasket is located between the cover 44 and a circular region of the housing 22 surrounding the periphery of the adjacent chamber opening in order to seal the latter from the atmosphere. Machine screws releasably connect the cover 44 to the housing 22.

The body portion 36 extends along the central axis of the chamber 26, and is oriented perpendicular to the direction of fluid flow moving through the inlet passageway 28 toward the chamber 26 (barring any localized disturbances of the fluid flow near the junction of the inlet passageway 28 and the chamber 26). The central axis of the body portion 36 is also perpendicular to the direction of fluid flow moving through the outlet passageway 32 away from the chamber 26 (barring any localized disturbances of the fluid flow near the junction of the chamber 26 and the outlet passageway 32). While it is presently preferred that the central axis of the body portion 36 is perpendicular to the direction of fluid flow in the inlet passageway 28 and the outlet passageway 32, other orientations that are generally perpendicular (that is, in the range of 90 degrees±10 degrees) are also possible and within the scope of the present invention.

Figure 7:
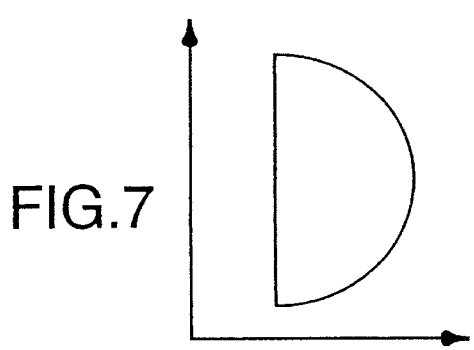
FIG. 7 is a graphical representation of the fluid discharge profile obtained by using the die illustrated in FIGS. 1 and 2.

The cylindrical peripheral surface of the body portion 36 provides control of flow of fluid moving through the die 20. With such construction, the pressure drop of fluid flow is greatest at the center of the chamber 26 in directions along its central longitudinal axis. A graphical representation of the fluid profile is illustrated in FIG. 7 for the die 20 of FIGS. 1 and 2. In FIG. 7, the horizontal axis represents the rate of fluid flow, while the vertical axis is representative of locations across the width of the outlet passageway 32 (i.e., in directions parallel to the longitudinal axis of the chamber 26). As can be observed, the profile is generally parabolic in shape, with the greatest flow being at the middle of the outlet passageway 32 and tapering off as either end of the outlet passageway 32 is approached.

Advantageously, both the first and second end portions 38, 40 are in firm, yet detachable engagement with the cylindrical wall section 24 of the housing 22. As a result, both ends of the insert 34 are supported by the housing 22 and resist oscillating as the fluid flows through the die 20. As shown in FIG. 1, the width of the outlet passageway 32 (i.e., in directions parallel to the longitudinal axis of the chamber 26) is equal to the distance between the second and first end portions 38, 40.

Figure 3:
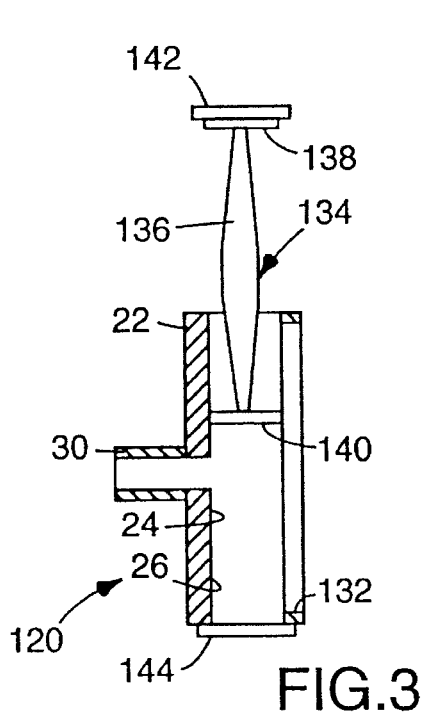
FIG. 3 is a view somewhat similar to FIG. 1 except that an insert of the die shown in FIG. 1 has been removed, and another insert having a somewhat different configuration is partially inserted in a die housing.
Figure 4:
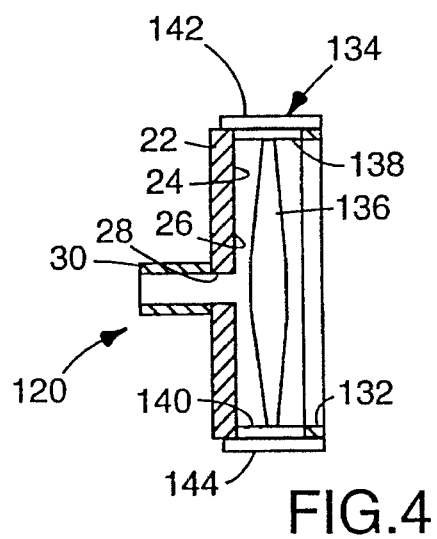
FIG. 4 is a view somewhat similar to FIG. 3 except that the insert is fully seated in the die chamber.

In FIGS. 3–4, a die 120 includes a housing 22 that is the same as the housing 22 described in connection with FIGS. 1 and 2. However, the die 120 has an insert 134 with a body portion 136 that is different from the body portion 36. More particularly, and as can be appreciated by reference to FIGS. 3–4, the body portion has a flow controlling peripheral surface that includes an enlarged central region and two conical regions that become smaller in diameter as either end of the chamber 26 is approached.

Like the body portion 36, the central axis of the body portion 136 extends along the central, longitudinal axis of the chamber 26. Moreover, like the body portion 36, the peripheral surface of the body portion 136 has a circular shape in reference planes perpendicular to the longitudinal axis of the body portion 136. As such, both of the body portions 36, 136 can be inexpensively machined on a lathe to precise dimensions.

Figure 8:
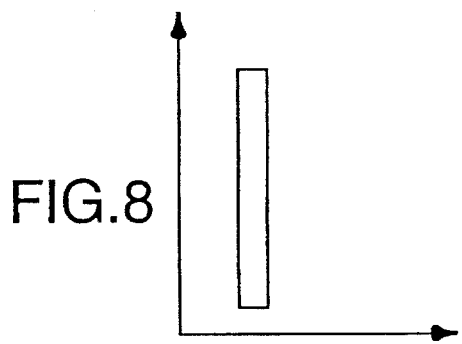
FIG. 8 is a graphical representation of the fluid profile that is obtained by using the die illustrated in FIG. 4.

The insert 134 also has a first end portion 138, a second end portion 140 and an end cap 142, all of which are identical to the first end portion 38, the second end portion 40 and the end cap 42 of the insert 34. As a result, a detailed description of such elements need not be repeated. A graphical representation of the profile provided by the die 120 is illustrated in FIG. 8. As illustrated, the die 120 provides a flat profile, such that the flow rate of fluid exiting the outlet passageway 32 is uniform across its entire width.

As can now be appreciated, the present invention enables the user to obtain different profiles without replacing or disassembling the housing 22. Either of the inserts 34, 134 can be removed from the chamber 26 and readily replaced with the other of the inserts 34, 134 as desired. FIG. 3 shows the step of placing the insert 134 in the housing 22. Further, it is possible to provide a variety of inserts having body portions with other configurations, so that a variety of profiles are available.

Figure 5:
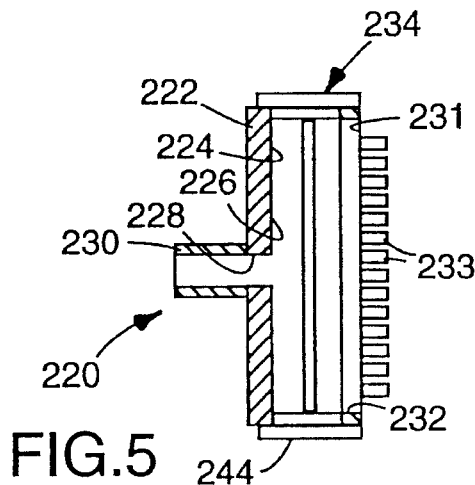
FIG. 5 is a horizontal cross-sectional view of a die in accordance with another embodiment of the invention.

Another embodiment of the invention is illustrated in FIG. 5, wherein a die 220 includes a housing 222 having an inner cylindrical wall section 224, a chamber 226, and an inlet passageway 228. A pipe 230 is connected to the inlet passageway 228. The wall section 224, the chamber 226, the inlet passageway 228 and the pipe 230 are all identical to the wall section 24, the chamber 26, the inlet passageway 28 and the pipe 30 described in connection with the embodiment illustrated in FIGS. 1 and 2.

An outlet passageway 232 of the housing 222 is identical to the outlet passageway 32 of the die 20, except that the downstream end of the outlet passageway 232 is closed by a flat wall 231. A series of bores are drilled in the wall 231, and a nozzle 233 is fixedly secured in each bore such that a number of distinct, spaced apart outlet orifices are provided.

Each nozzle 233 is made of a rigid metal tube or needle having a flattened outer end. Alternatively, each nozzle 233 is a commercially available nozzle optionally having an adjustment for varying the flow rate of fluid output or the pattern of the discharged fluid. The spaced apart nozzles 233 provide individual fluid streams that may, for example, be applied to a moving web passing adjacent the die 220.

An insert 234 of the die 220 is removably received in the chamber 226 and is identical to the insert 34 described in connection with the embodiment shown in FIGS. 1 and 2. A cover 244, identical to cover 44, is secured to the end of the housing 222 over one end of the chamber 226.

Figure 9:
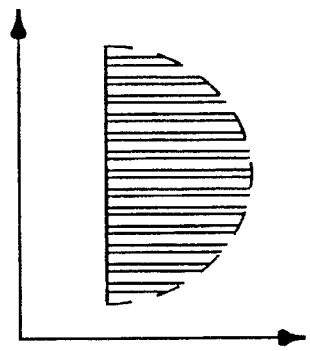
FIGS. 9 and 10 are graphical representations of the fluid profiles obtained by using the dies depicted in FIGS. 5 and 6 respectively.

A graphical representation of the fluid profile provided by the die 220 is illustrated in FIG. 9. Although the nozzles 233 provide spaced apart fluid streams, the streams when averaged together provide a profile that is similar to the profile illustrated in FIG. 7 for the embodiment shown in FIGS. 1 and 2. The fluid streams may touch or overlap each other if desired as the streams engage the web.

Figure 6:
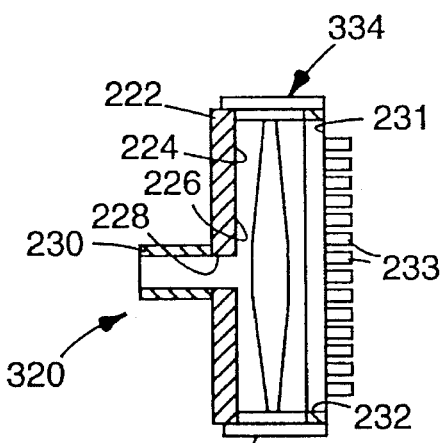
FIG. 6 is a view somewhat similar to FIG. 5 except that an insert of the die illustrated in FIG. 5 has been replaced with another insert having a somewhat different configuration.
Figure 10:
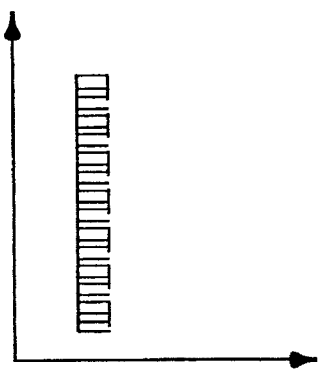

In FIG. 6, a die 320 includes the housing 222 described earlier, as well as an insert 334 that is identical to the insert 134 described in connection with the embodiment shown in FIGS. 3–4. FIG. 10 is a graphical representation of the fluid profile obtained by using the die 320.

Fine adjustments to the die profiles obtained using the dies 20, 120, 220, 320 could be carried out using conventional techniques that are known to those skilled in the art. For example, the temperature of the die or the incoming fluid could be changed to a temperature above or below ambient. As another option, the outlet passageway of the die could be provided with a flexible lip in contact with multiple adjustment screws distributed across the outlet passageway, such that rotation of the screws could increase or decrease the flow rate in adjacent regions of the passageway.

One example of a use for the dies 20, 120, 220, 320 is described in pending U.S. patent application Ser. No. 08/301,258 entitled "Web Coating Apparatus", filed on even date herewith. The web coating apparatus described in that application is especially suitable for use in the manufacture of orthopedic splinting/casting tape that includes a web made of a porous knit fiberglass material. The dies 20, 120, 220, 320 are used to apply a coating of water curable polyurethane resin to the web in precise quantities as the web is advanced.

Figure 11:
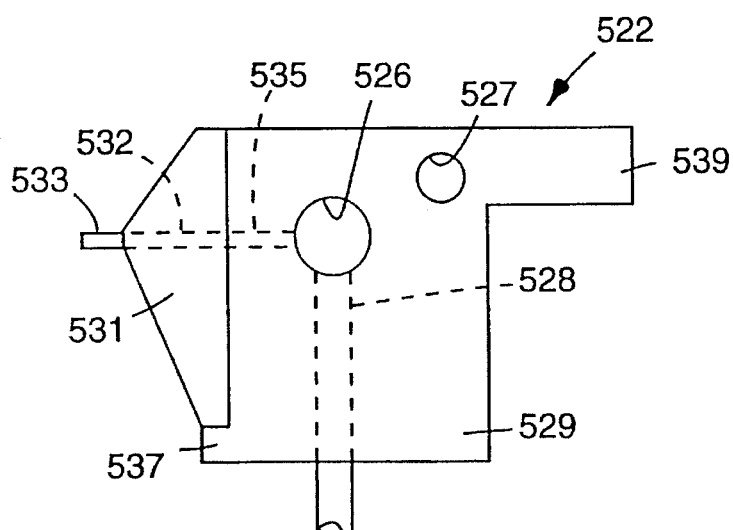
FIG. 11 is a side elevational view of a die housing according to another embodiment of the invention.

FIG. 11 is a side view of a die housing 522 in accordance with another embodiment of the invention. The die housing 522 includes a cylindrical chamber 526, as well as an auxiliary channel 527 that extends through the housing 522 in parallel relation to the chamber 526. The channel 527 is coupled to a source of hot water or other fluid, in order to elevate the temperature of the housing 522 above ambient for enhancing the flow of fluid moving through the chamber 526.

The die housing 522 includes a first metallic member 529 that contains the chamber 526 and the channel 527, along with a second metallic member 531 that is detachably connected to the first member 529 by four machine screws. An aligned series of spaced apart nozzles 533 extend through the second member 531 and project forwardly of the same. An outlet passageway 532 of the die housing 522 includes the nozzles 533 as well as a rectangular slot 535 that communicates the nozzles 533 with the chamber 526. The first member 529 includes a shoulder 537 for supporting the second member 531 and facilitating assembly of the second member 531 to the first member 529. The first member 529 also includes a flange 539 for connection to a device for supporting the die housing 522 such as, for example, a fixed arm mounted adjacent a moving web or an arm that is movable toward or away from the web.

Figure 12:
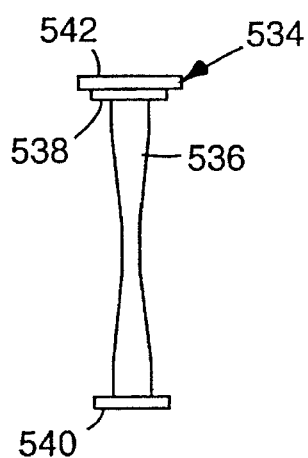
FIG. 12 is a plan view of an insert having a somewhat different configuration that is particularly advantageous when used with the die housing depicted in FIG. 11.

The direction of fluid flowing through an inlet passageway 528 toward the chamber 526 is perpendicular to the direction of fluid flowing through the outlet passageway 532 away from the chamber 526. The chamber 526 is adapted to removably receive an insert such as the inserts 34, 134, 234, 334 mentioned above, or alternatively receive the insert 534 that is illustrated in FIG. 12.

The insert 534 has a body portion 536 having a central cylindrical section, a pair of end cylindrical sections and two generally frustoconical sections integrally interconnecting the central section and the end sections. The two end sections have a larger cross-sectional diameter than the central section, and are each located next to a respective end portion 538, 540. The insert 534 is slidably received in the chamber 526, and includes an end cap 542 that optionally is coupled to a handle. The "dogbone" shape of the body portion 536 is particularly advantageous in achieving a generally flat fluid profile when used in a die housing such as die housing 522 wherein the direction of fluid flowing through an inlet passageway is perpendicular to the direction of fluid flowing through an outlet passageway.

As an alternative to the machine screws for connecting the second member 531 to the first member 529, the shoulder 537 may be replaced with an L-shaped shoulder having an upstanding leg, and the second member 531 may have a portion that is slidably received between the upstanding leg and remaining parts of the first member 529. The top of the second member 531 (viewing FIG. 11) in such an instance would be formed with a hook, and a clamp attached to the first member 529 would releasably engage the hook to securely hold the second member 531 against the first member 529 such that the nozzles 533 are aligned and in communication with the slot 535. Preferably, the clamp includes an over-center cam arm that releasably locks the wire loop in engagement with the hook.

The principals of the present invention will now be apparent, and those skilled in the art may recognize other modifications or additions that may be employed without departing from the spirit of the invention. For example, the body portion of the insert may have an outer surface configuration that can be selectively varied by the user during operation. One example is an insert with a central, longitudinal, rigid rod that is surrounded by an expandable bladder. Air or fluid pressure applied to one or more chambers of the bladder enables the configuration of the bladder's surface to be altered. A variety of other modifications and additions are also possible. Accordingly, the scope of the invention should only be limited by a fair reading of the claims that follow and their equivalents.

We claim:

1. A die for extruding a fluid stream comprising:

a housing having inner wall sections defining a chamber, said inner wall sections including a cylindrical section, said housing including an inlet passageway in communication with said chamber and an outlet passageway in communication with said chamber; and an insert removably received in said chamber, said insert having a body portion with a central axis and a flow-controlling peripheral surface extending in an arc around said central axis, said central axis being oriented generally perpendicular to the direction of fluid flow moving through said inlet passageway toward said chamber and moving through said outlet passageway away from said chamber, said insert having a first end portion and a second end portion, said body portion being located between said end portions, both of said first end portion and said second end portion being in detachable engagement with said wall sections of said housing, and wherein at least one of said end portions includes a cylindrical surface that is complemental to and engages said cylindrical section.

2. The die of claim 1, wherein said insert includes an end cap located next to one of said end portions remote from said body portion, said end cap being larger than said one end portion in directions perpendicular to said central axis.

3. The die of claim 1, wherein said chamber has a generally cylindrical configuration.

4. The die of claim 1, wherein said insert is slidably received in said chamber.

5. The die of claim 4, wherein said end portions are in sliding engagement with said wall sections defining said chamber.

6. The die of claim 1, wherein said outlet passageway includes a number of distinct, spaced apart outlet nozzles.

7. The die of claim 1, wherein said outlet passageway includes an elongated, generally rectangular outlet slot.

* * * * *